Sept. 1, 1936.  F. A. PARSONS  2,052,648
MILLING MACHINE ORGANIZATION
Original Filed Dec. 3, 1931   4 Sheets-Sheet 1
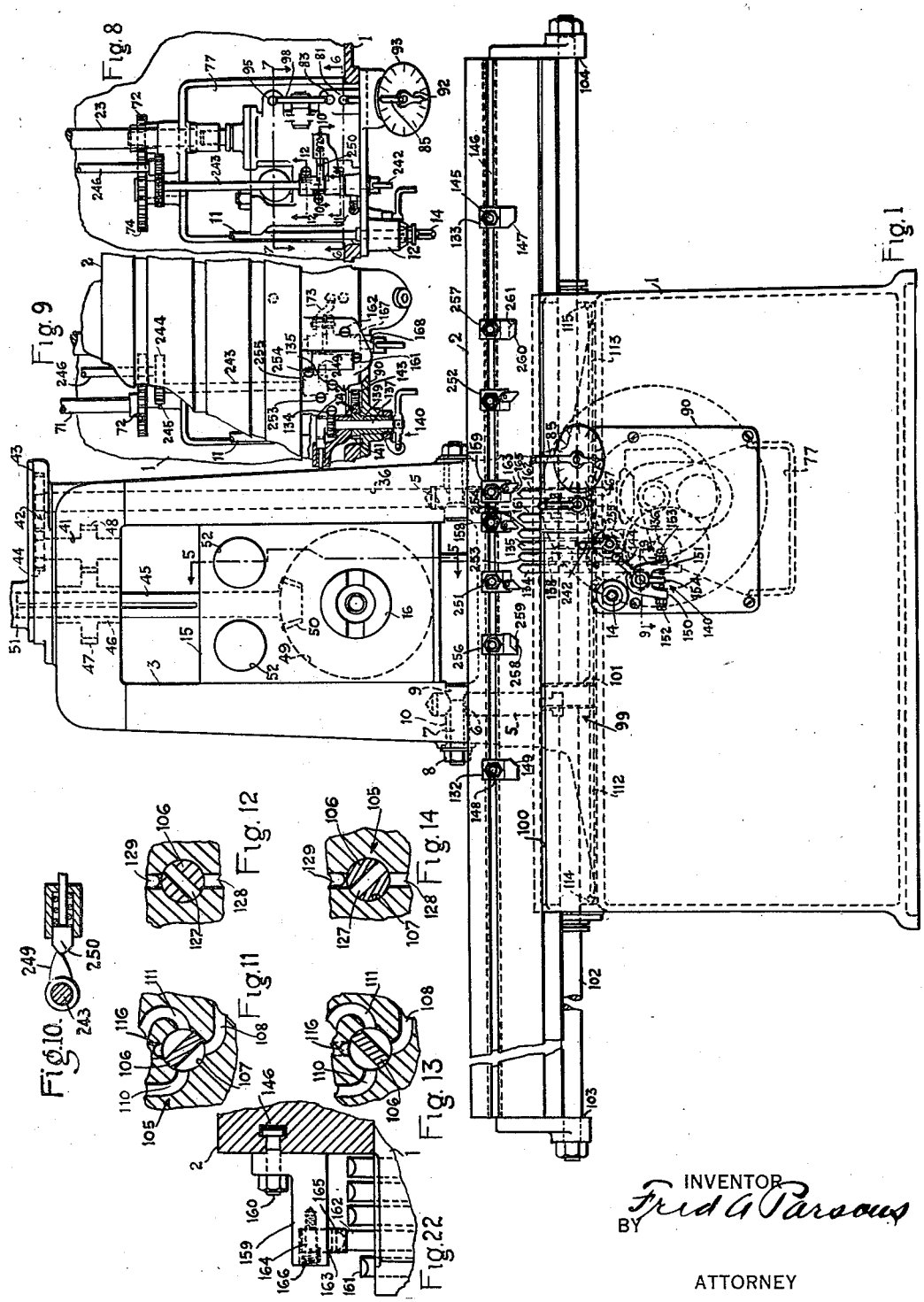
INVENTOR
Fred G. Parsons
BY
ATTORNEY

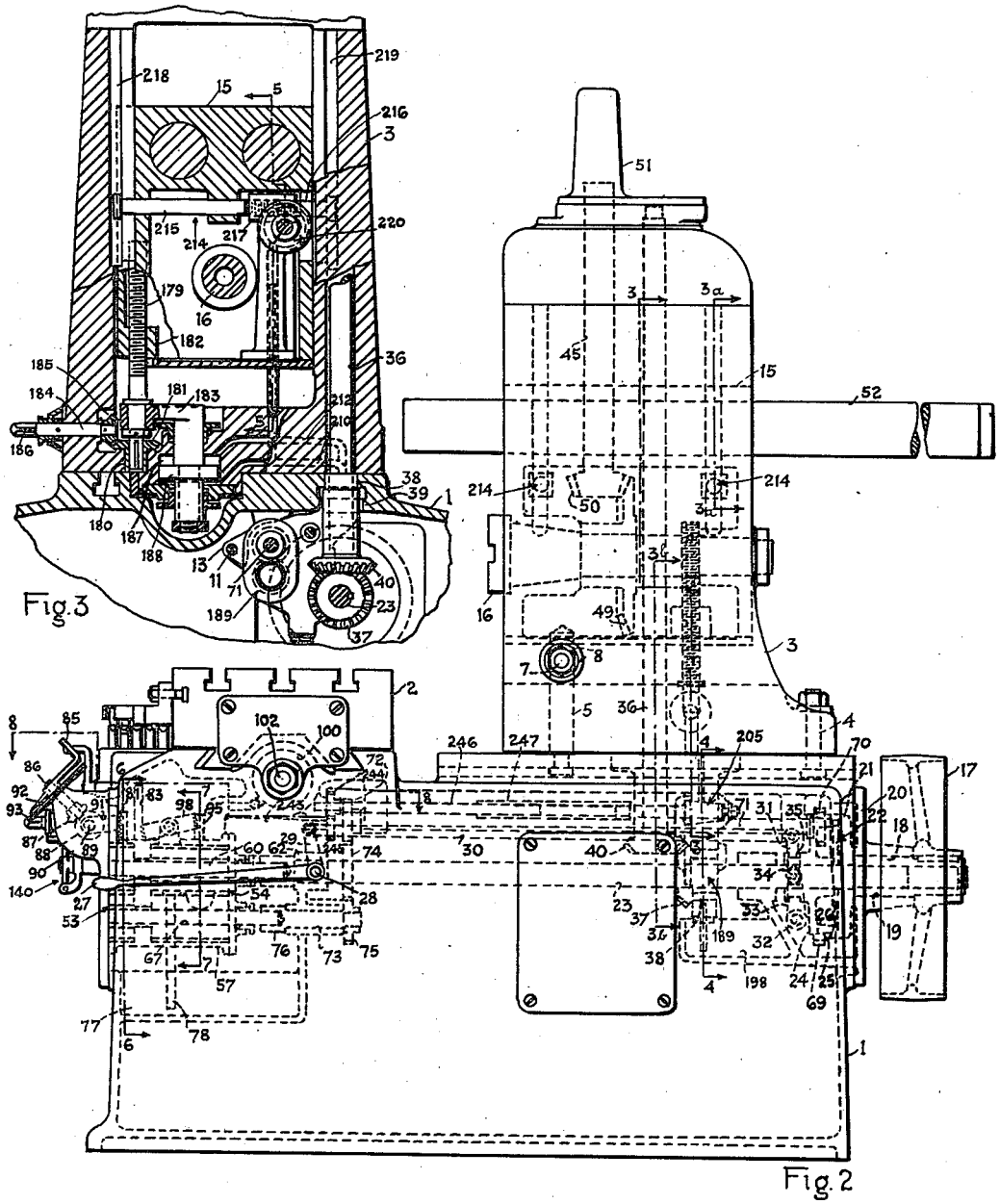

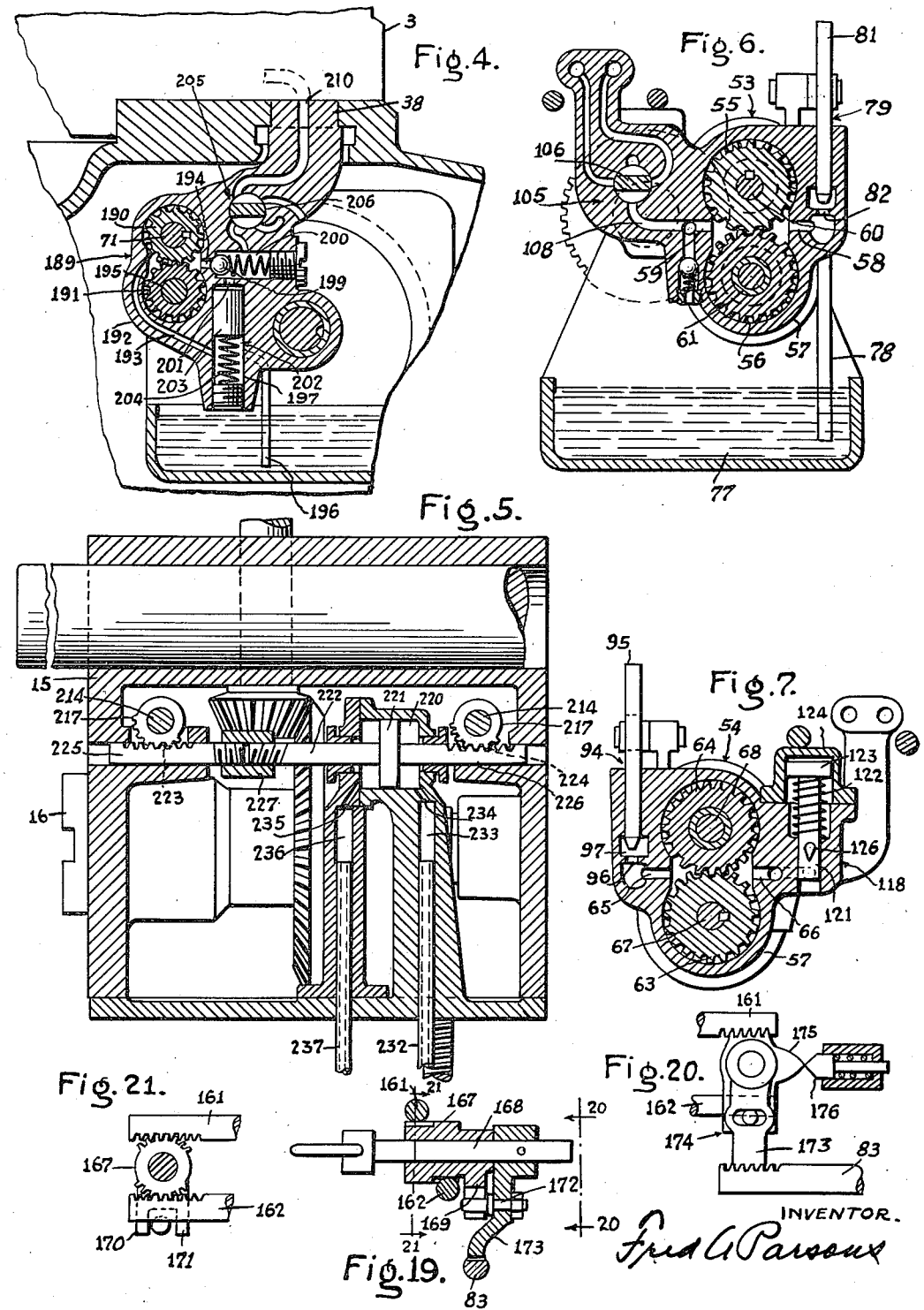

Sept. 1, 1936.  F. A. PARSONS  2,052,648
MILLING MACHINE ORGANIZATION
Original Filed Dec. 3, 1931  4 Sheets-Sheet 4
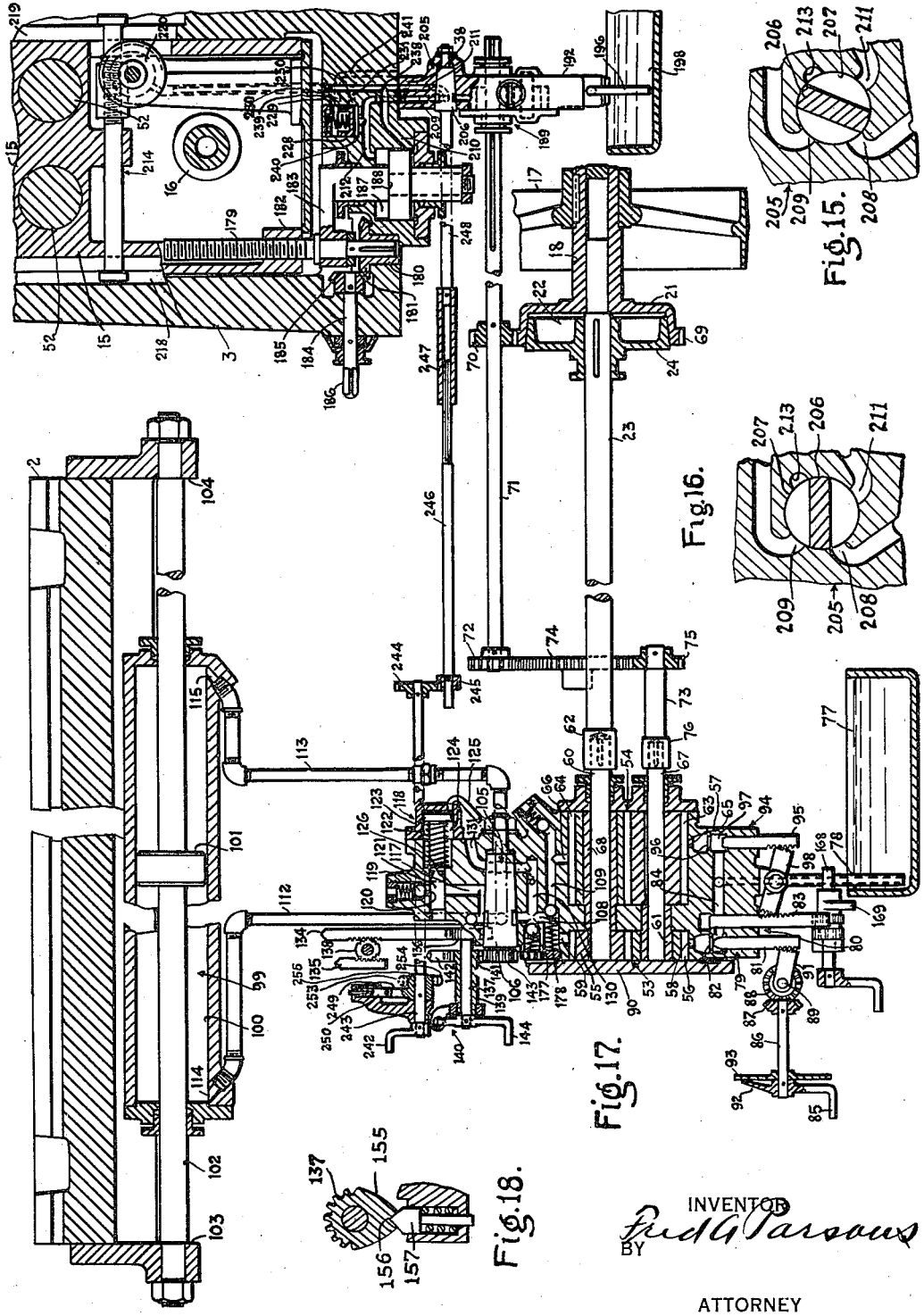
INVENTOR
Fred G. Parsons
BY
ATTORNEY Patented Sept. 1, 1936

2,052,648

UNITED STATES PATENT OFFICE 2,052,648

MILLING MACHINE ORGANIZATION

Fred A. Parsons, Milwaukee, Wis., assignor to Kearney & Trecker Corporation, West Allis, Wis.

Application December 3, 1931, Serial No. 578,684
Renewed January 30, 1935

8 Claims. (Cl. 90—21.5)

This invention relates to transmission and control mechanism for machine tools and more particularly for milling machines.

It is an object of the invention to provide mechanism in a milling machine for separating the work and cutter during a portion of the operating cycle, particularly during backward movements, or during quick traverse movement of the table.

Another object is to provide a specific form of such a cutter and work separating mechanism in which it is the cutter which is bodily moved during movement of separation.

A further purpose relates to provision of such mechanism which is, in part at least, of hydraulically operated type.

Another purpose relates to the automatic control of the machine including the above mentioned mechanism whereby the work and cutter separation will take place, when desired, without special attention on the part of the operator.

Another object relates to an improved combination of mechanism for purposes above mentioned with other structure and transmission and control mechanism of a milling machine.

Another object relates to an improved spindle supporting structure for a milling machine and improved mechanism for bodily spindle movement and particularly for such movements in automatically timed relationship with other movements.

Other objects relate to power clamping of movable supports of a milling machine and to the automatic control thereof in timed relationship with other operations in the machine cycle.

Another object is generally to simplify and improve the construction and operation of milling machines, and still other objects will be apparent from the specification and claims.

The invention consists in the particular arrangement and combination of parts herein illustrated, described, and claimed, and in such modifications of the illustrated and described structure as may be equivalent to the claims.

In the drawings like reference characters have been applied to the same parts in each of the several views of which:

Fig. 1 is a front elevation of a milling machine in which the invention is incorporated.

Fig. 2 is a right side elevation of the same machine.

Fig. 3 is a sectional view of the machine taken partly along line 3—3 of Fig. 2, partly along line 3a—3a as to the upper right and left portions, and along line 3b—3b as to a lower right-hand portion.

Fig. 4 is a sectional view on the line 4—4 of Fig. 2.

Fig. 5 is a sectional view on the line 5—5 of Figs. 1, 3.

Fig. 6 is a sectional view on the line 6—6 of Figs. 2, 8.

Fig. 7 is a sectional view on the line 7—7 of Figs. 2, 8.

Fig. 8 is a horizontal section taken along line 8—8 of Fig. 2.

Fig. 9 is a plan view in part section on the line 9—9 of Fig. 1.

Fig. 10 is a detail in part section on the line 10—10 of Fig. 8.

Fig. 11 is an enlarged transverse section through a valve portion taken along line 11—11 of Fig. 8.

Fig. 12 is an enlarged transverse section through a valve portion taken along line 12—12 of Fig. 8.

Fig. 13 is a section similar to Fig. 11, but showing a different position of the valve member.

Fig. 14 is a section similar to Fig. 12, but showing a different position of the valve member.

Figs. 15 and 16 are enlarged sectional views of portions of a valve shown in Fig. 4 with the valve member in different positions.

Fig. 17 is a schematic view in the nature of a development showing the operative relation of the parts of the machine.

Fig. 18 is a view in part section of a detail indicated in Figs. 9 and 17.

Figs. 19, 20, and 21 are details of the mechanism indicated in Fig. 17.

Fig. 22 is a detail in part section of one of the table dogs.

Referring to Figs. 1 and 2, the milling machine includes a bed or base 1 having a work table 2 mounted for reciprocation thereon to the right or left in Fig. 1. A head frame 3 is slidably fixed with the bed for horizontal movement transverse to the table movement and means are provided in the form of T-bolts 4—4 and 5—5 engaging suitable slots in bed 1 for clamping the frame in its various positions. Bolts 4—4 are tightened by suitable nuts in the usual manner but bolts 5—5 are constructed to avoid extending them through the entire height of the frame. Being similar, only one will be described in detail. As seen in Fig. 1, bolt 5 has a transverse bore 6 at its upper end through which a member 7 extends outside of the frame and threadedly engages a nut 8. Member 7 has an enlarged conical head 9 slidably fitting a bore in frame 3 and engaging a complementary surface formed at the end of bore 6. A sleeve 10 is slidably fitted in frame 3 and has a bore in which member 7 is fitted, the sleeve having a conical end engaging a complementary surface at the other end of bore 6. Sleeve 10 and member 7 are prevented from rotating by any suitable means, not shown, and when nut 8 is suitably turned, the conical portions of member 7 and sleeve 10 are forced toward each other, forming oppositely disposed wedges tending to lift bolt 5 for clamping, there being clearance on the under side of bore 6 to allow such movement of bolt 5.

For moving the head frame a screw 11, Figs. 3, 8, and 9, is provided journaled in a bearing 12 fixed with bed 1 and prevented from moving axially therein. Screw 11 engages a nut portion 13 fixed with frame 3 and causes sliding movement thereof when it is turned by means of a suitable crank, not shown, applied to the squared portion 14.

Frame 3 supports a spindle carrier 15 slidably guided for vertical movement and having a tool spindle 16 rotatably mounted therein. Means later described are provided for moving carrier 15 vertically and clamping it in the various positions of adjustment.

Spindle 16 may be rotated by means of the following transmission mechanism. A pulley 17 is fixed on a sleeve 18, Figs. 2 and 17, journaled in a suitable bearing 19 in a member 20 fixed with the bed 1, the sleeve 18 also having fixed thereon a member 21 constituting a part of a clutch generally denoted by numeral 22. Member 21 drives a shaft 23 through the medium of a member 24 slidably keyed on shaft 23 and frictionally engageable with member 21 on surfaces 25 and 26. Member 24 may be moved into and out of engagement with member 21 by means of a hand lever 27 fixed on a shaft 28 suitably journaled in bed 1 and having also fixed thereon a lever 29. A rod 30 connects lever 29 with a lever 31 fulcrumed on a shaft 32 journaled in suitable bearings in member 20 and having a member 33, Fig. 1, fixed therewith carrying a pivoted shoe 34 engaging a groove 35, Fig. 2, formed in member 24. Movement of lever 27 up or down will accordingly cause movement of member 24 into or out of engagement respectively with member 21 and thus start or stop rotation of shaft 23.

Shaft 23 is journaled in suitable bearings in bed 1 and drives a shaft 36 by means of a bevel gear 37 slidably keyed upon shaft 23 and having a portion journaled in a bracket 38 fixed with head frame 3 and depending through a slot 39, Fig. 3, in bed 1. Gear 37 meshes with a bevel gear 40 fixed on shaft 36. Shaft 36 drives a shaft 41, Fig. 1, by means of a rate changer, generally denoted by numeral 42, and consisting of a gear 43 removably keyed to shaft 36 and meshing with a gear 44 removably keyed to shaft 41. Gears 43—44 are of different diameter and are interchangeable to produce different speeds in shaft 41 and may be replaced with other gears of different ratios also interchangeable to produce still other speeds. Shaft 41 drives a shaft 45 by means of a sleeve 46 slidably keyed to shaft 45 having a gear 47 fixed therewith and meshing with a gear 48 fixed with shaft 41. Shaft 45 drives spindle 16 through the medium of a ring gear 49 fixed on spindle 16 and meshing with a bevel gear 50 fixed on shaft 45. Sliding connection of bevel gear 37, Fig. 3, with shaft 23 will permit sliding adjustment of frame 3 relative to bed 1 without interrupting the driving relation between shaft 23 and shaft 36, and spindle carrier 15 may be adjusted vertically without interrupting the driving connection between shaft 41 and shaft 45, the sliding relation of shaft 45 and sleeve 46, Fig. 1, allowing shaft 45 to move vertically with carrier 15 during such adjustment. A housing 51 is provided for the projecting end of shaft 45. Overarms 52—52 may be provided slidably mounted in carrier 15.

Transmission mechanism for movement of table 2 is provided including a feed pump of relatively small displacement, generally denoted by the numeral 53, Figs. 2 and 17, and a rapid traverse pump of relatively large displacement, generally denoted by numeral 54.

Feed pump 53 may be of any suitable type, but in this instance consists of gears 55 and 56, Figs. 6 and 17, meshed together within a substantially closed housing 57, as shown in Figs. 6 and 17, the housing providing an inlet port 58 and an outlet port 59. Gear 55 is fixed on a shaft 60 journaled in housing 57 and gear 56 is freely rotatable on a sleeve 61 fixed in the housing. Pump 53 is connected to be driven through main clutch 22 from shaft 23 by means of shaft 60 rotative from shaft 23 by means of a coupling 62. Quick traverse pump 54 may be of any suitable type, but in this instance consists of gears 63 and 64, Fig. 7, meshed within substantially closed housing 57 having an inlet port 65 and an outlet port 66. Gear 63 is fixed on a shaft 67 journaled in casing 57 and above mentioned sleeve 61, while gear 64 is supported for rotation on a sleeve 68 enclosing shaft 60 and forming a bearing for one end thereof. Shaft 67 is driven from the spindle transmission at a point between pulley 17 and main clutch 22, to exclude the clutch, by means of a train including a gear 69, Fig. 17, fixed with clutch member 21, a gear 70 fixed on a shaft 71 and meshed with gear 69, a gear 72 fixed on shaft 71 and driving a shaft 73 through the medium of an idler gear 74, and a gear 75 fixed on shaft 73 and meshed with idler gear 74. Shaft 73 is coupled with shaft 67 by means of a coupling member 76.

The pumps 53 and 54 are each supplied with fluid from a reservoir 77, with which the inlet ports of the pumps communicate by means of a suction pipe 78 and other suitable channels.

The inlet port 58 of the feed pump 53 receives fluid from reservoir 77 through a feed regulating throttle, generally denoted by numeral 79, Figs. 6 and 17, and through a cut-off throttle, generally denoted by numeral 80, Fig. 17.

The feed regulating or rate control throttle 79 consists of a plunger 81 having a tapered end portion adapted to more or less restrict a throttle opening 82, in accordance with the position of plunger 81 whereby to determine the rate of flow to and from pump 53, as more fully explained in a copending application of Fred A. Parsons, Serial No. 321,250, filed November 22, 1928. A feed cut-off throttle or valve 80 consists of a plunger 83 having an end portion adapted to completely close a channel 84 leading from a reservoir 77 when the plunger is in the position shown in Fig. 17. Thus the fluid flow to the pump 53 may be completely cut off by throttle 80 or may be predetermined in accordance with the position of feed regulating throttle 79 when throttle 80 is open. Throttle 79 may be manually regulated by means of a lever 85, Figs. 1, 2, 8, and 17, fixed on a shaft 86 on which is fixed a bevel gear 87 meshed with a gear 88 fixed on a shaft 89 journaled in a member 90 and having fixed thereon a segment 91 engaging rack teeth in plunger 81. A pointer 92 is fixed to move with lever 85 and adapted to visibly indicate against a stationary dial or chart 93 the position of plunger 81. Chart 93 is preferably graduated in correspondence with the feed rates resulting from different throttle positions.

The inlet port 65 of quick traverse pump 54 communicates with the fluid reservoir 77 through a cut-off throttle or valve, generally denoted by numeral 94, Fig. 17, consisting of a plunger 95 movable for an end portion thereof to open or to completely close a throttle opening 96 communicating with channel 97 leading from suction pipe 78.

The throttle plungers 83 and 95 are connected for dependent action by means of a pivoted lever 98 having segment teeth on the opposite ends to engage suitable rack teeth on the plungers whereby one of the cut-off throttles 89, 94 is completely opened when the other is completely closed. The opening of the first cut-off throttle determines a feed rate of delivery from pumps 53, 54 in accordance with the position of adjustment of rate control throttle 79, while the opening of the quick traverse cut-off throttle provides a quick traverse rate of delivery from the pumps. The output of pumps 53 and 54 may drive a motor, for driving table 2, generally denoted by the numeral 99, and including a cylinder 100 and a piston 101 fixed on a piston rod 102 which is fixed at its ends 103—104 for movement with table 2. The pump fluid passes to the motor 99 through a reverser valve generally denoted by the numeral 105, Figs. 6, 17.

Reverser valve 105, as shown in Figs. 6 and 11 to 14 inclusive, consists of a member 106 rotatably fitted in a chamber 107 and having cut-away portions, as particularly shown in Figs. 11 to 14 inclusive.

The channels connecting pumps 53, 54 with motor 99 are as follows: As shown in Figs. 6 and 17, outlet port 59 of feed pump 53 communicates with a channel 108 and outlet port 66 of quick traverse pump 54 also communicates with channel 108 through a channel 109, Fig. 17. Channel 108 leads into chamber 107 of reverser valve 105 adjacent to ports 110 and 111 which communicate respectively with channels 112 and 113, Figs. 1, 17, respectively communicating with the different ports 114 and 115 of the cylinder 100. A port 116 enters the valve chamber at a point between the ports 110 and 111 and serves as an exhaust passage for fluid returning from cylinder 100. Referring to Figs. 11 and 13, it will be seen that with valve 106 in the position shown in Fig. 11 fluid will pass from passageway 108 to port 110 and through channel 112, Figs. 1, 17, and port 114 into cylinder 100, thus forcing piston 101, piston rod 102 and table 2 to the right in Fig. 17. Fluid in the right end of cylinder 100 will pass out through port 115, channel 113, and port 111 to port 116 and be returned to reservoir 77 through a channel 117, Fig. 17. When valve member 106 is in the position shown in Fig. 13, the connections will be reversed and liquid will flow to cylinder 100 through port 111 and channel 113 and port 115, and be returned to port 116 through port 114, channel 112 and port 110, thus moving table 2 to the left.

Fluid exhausting from motor 99 through port 116 and channel 117 is forced to pass through an overrun preventing valve, generally denoted by numeral 118, and a back pressure valve in the form of a spring pressed ball 119 cooperating with a seat in an outlet port 120.

The operation of overrun prevention valve 118, Figs. 7, 17, which has been fully described in the above mentioned copending application, Serial No. 321,250, includes a plunger 121 pressed to the right, Fig. 17, by a spring 122 and having fixed thereon a piston head 123 movable in a cylinder 124. A pipe or channel 125 supplies fluid pressure to oppose spring 122 by means of fluid under pressure derived from a point in channel 108 between pump 53 and reverser valve 105. Plunger 121 provides a throttle opening 126 movable with the plunger to more or less restrict the outlet of fluid, the arrangement being such that as the forward pressure on the motor is decreased, the back pressure is automatically increased by the restriction of the throttle opening whereby a zero or negative forward pressure such as would permit overrun, can never occur. The arrangement also tends to set up pressure on both sides of the motor piston at light or moderate loads whereby to avoid vibration or chatter.

When valve member 106 is in central position, as shown in Fig. 6, the passages to or from cylinder 100 are closed and table 2 is locked against movement in either direction. At this time a passage 127, Figs. 12 and 14, formed in valve member 106, will register with ports 128 and 129 communicating respectively with passage 108 through a passage 130 and a passage 131 whereby any fluid coming from either of pumps 53 or 54 will be freely returned to reservoir 77.

Reverser valve member 106 may be moved by means of table dogs 132 or 133 adapted during the course of table movement to contact the one or the other of trip plungers 134 and 135, plunger 134 having rack teeth respectively engaging a pinion 136 fixed on a shaft 137 and a pinion 138 which engages rack teeth on plunger 135. Shaft 137 actuates a sleeve 139, Fig. 17, through a lost motion device, generally denoted by numeral 140, Figs. 1, 2, 9, and 17, and which is later described. Sleeve 139 is journaled in a suitable bearing in member 90 and has a gear segment 141 fixed thereon meshing with rack teeth in a plunger 142 vertically slidable and extending downwardly sufficiently to engage a gear segment 143 fixed on reverser valve member 106 whereby motion of either plunger 134 or 135 will cause rotary movement of member 106.

Reverser valve member 106 may also be moved by a hand lever 144 fixed on the shaft 137.

The arrangement is such that when hand lever 144 is moved to the left, in Fig. 1, fluid will be applied to the end of cylinder 100 to move table 2 to the left, in Fig. 1, plunger 134 will be lowered, and through pinion 138, plunger 135 will be raised into the path of a table dog 133. Dog 133 is adjustably fixed on table 2 by means of a T-bolt 145 and T-slot 146 and has a cam surface 147 thereon. Cam surface 147 will during the course of table movement contact plunger 135 at a predetermined point in the table movement, forcing the plunger downwardly and, if no lost motion is provided in device 140, bringing lever 144 to a central position corresponding to the valve position shown in Fig. 6 to stop the table.

When lever 144, Fig. 1, is moved to the right, fluid will be applied to the end of cylinder 100 to move table 2 to the right, plunger 134 will be raised and plunger 135 lowered, as above described. Dog 132 fixed on table 2 by means of a T-bolt 148 operating in T-slot 146 and having a cam surface 149 at a predetermined point in movement of table 2 contacts plunger 134 by means of surface 149 forcing it downwardly and bringing valve member 106 to its central position, as above outlined, and stopping the table.

Automatic reversing of table 2, alternatively available instead of the stop previously described, is provided by the means of the lost motion device 140 which includes lugs 150 and 151, Fig. 1, fixed with sleeve 139, Fig. 9, and having screws 152 and 153 adjustable therein to contact opposite sides of an ear or lug 154 fixed with hand lever 144 or to allow a predetermined amount of lost motion in either direction. Pinion 136 has a cam portion 155, Fig. 18, having a central notch 156 engaged by a spring pressed plunger 157. When table 2 is moving, for example, to the right, plunger 134 will be contacted at a predetermined point in table travel by the surface 149 of dog 132. Plunger 134 will then be forced downwardly, causing shaft 137 to turn and sleeve 139 will be moved with shaft 137 and cam 155, turning valve member 106 towards its central position which it would normally reach at the same time that the central notch of the cam is engaged by the spring plunger, thereby stopping the table, as previously noted. But if lost motion is provided at 140, cam 155 will reach its central position before valve member 106, and before movement of the table stops plunger 157 acting against the cam will cause movement of shaft 137 and lever 144 to its extreme left position. Similarly, automatic reversal may be caused to take place in the other direction. Thus in either direction of table movement the table may, at the end of its travel, be brought to a stop or reversed automatically.

For automatically changing from feed rate to rapid traverse rate the cut-off throttles 80 and 94, previously described, are connected for operation from table dogs 158 and 159. As indicated in Fig. 22, each dog is adjustably fixed to table 2 by means of a bolt such as 160 having a T-head engaging T-slot 146 in table 2, and actuates one of plungers 161 and 162 by means of a latch member 163 pivoted on a stud 164 fixed with the dog. The latch depresses its plunger when table 2 moves in one direction by means of a cam surface 165, but when table 2 moves in the opposite direction, latch 163 when it encounters its plunger swings about stud 164 and passes over the plunger without affecting it. A spring 166 returns latch 163 to the position shown when it has passed the plunger. If the same change in rate is intended to take place at the same point in both directions of table travel, the dogs may be of solid type. Plungers 161 and 162 are vertically slidable in bed 1, so located as to be contacted by one or another of dogs 158 and 159, or others of similar or suitable type, the plungers being located at different distances from table 2, Fig. 9, whereby dogs may be caused to contact either plunger without affecting the other, and in either direction of travel of the table. Plungers 161 and 162 are connected at their lower ends by a pinion 167, see Figs. 1, 17, 19, 20, and 21, rotatably mounted on shaft 168 and having a portion 169 extending therefrom and having abutments 170 and 171 between which passes a pin 172 adjustably fixed to segment 173 and constituting a lost motion device, generally denoted by numeral 174, between pinion 167 and shaft 168. At desired points in the travel of table 2 dog 158, or a similar or suitable dog, may contact plunger 161, forcing it downwardly and causing rotation of pinion 167 whereby to close cut-off throttle 80 and at the same time to admit fluid to rapid traverse pump 54 to cause rapid traverse of table 2. Also at any predetermined point in travel of table 2 dog 159 may be caused to contact plunger 162 thereby causing rotation of pinion 167 in the opposite direction whereby to close the quick traverse cut-off throttle 94 and at the same time to admit fluid through cut-off throttle 80 and feed rate throttle 79 to feed pump 53, whereupon table 2 will continue to move in the same direction but at a feed rate determined by the feed rate throttle. Suitable dogs such as described may be used to cause table 2 to proceed at either a rapid traverse rate or at a feed rate in any part of its stroke in either direction, the dogs merely projecting sufficiently from the table to contact the desired plunger.

Lost motion device 174 is provided for the purpose of obtaining instantaneous and positive action of throttles 80 and 94 regardless of the speed of table travel and movement of plungers 161 and 162. In either direction of throttle movement when a dog contacts one of the plungers 161 or 162 and starts to move it downwardly, a cam portion 175 of pinion 167 will rotate for some distance without disturbing the position of segment 173 or plungers 83 and 95 owing to the provision of lost motion between a portion 170 and a pin 172. However, as soon as cam portion 175 has passed slightly beyond its middle position, a spring plunger 176 acting on the face of cam 175 will instantaneously move throttles 80 and 94 to the limit of their travel in the same direction in which they were moving.

To guard against damage to the mechanism from over pressure, a relief valve is provided for fluid passage 108 in the form of a spring pressed ball 177 cooperating with a suitable seat in passage 130.

It is desirable that when feed pump 53 is operating the fluid pressure should not react on the rapid traverse pump 54 and to accomplish this purpose discharge port 66 of rapid traverse pump 54 communicates with passage 108 through a passage 109 having a one-way valve consisting of a spring pressed ball 178 cooperating with a suitable seat in passage 109.

For manually raising and lowering carrier 15 there is provided a vertical screw 179, Figs. 3 and 17, slidably keyed in the hub portion 180 of a bevel gear 181 journaled in a portion of head frame 3. Screw 179 engages a nut portion 182 in spindle carrier 15 and is fixed against axial movement relative to a member 183. A shaft 184 is journaled in head frame 3 and has fixed therewith a bevel gear 185 engaging gear 181. Shaft 184 may be turned by means of a suitable crank, not shown, applied to a squared portion 186 thereof.

Carrier 15 may also be raised and lowered by fluid pressure admitted to a cylinder 187 formed in the head frame 3 having a piston 188 slidable therein and fixed on member 183. Fluid for cylinder 187 is supplied by a pump 189, Figs. 4 and 17, associated with bracket 38 and which may be of any suitable type, but in this instance consists of gears 190 and 191 meshed together in a substantially closed casing 192 providing an inlet passage 193 and an outlet passage 194. Gear 190 is slidably keyed on shaft 71 to permit sliding adjustment of frame 3, while gear 191 is rotatable on a stud 195 fixed with casing 192. Inlet passage 193 communicates with a suction pipe 196 through the lower portion of a vertical cylinder 197 formed in bracket member 38 and draws fluid from a reservoir 198 fixed with member 20 and extending under member 38 in all positions of sliding adjustment thereof. Discharge passage 194 communicates through a one-way valve consisting of a spring pressed ball 199 cooperating with a suitable seat in a chamber 200 having a port 201 leading into an accumulator, generally denoted by numeral 202, and including above mentioned cylinder 197 and piston 203 pressed upwardly by spring 204 and designed to maintain under pressure sufficient fluid to meet the instantaneous requirements of cylinder 187.

In order to prevent power loss at times when there is no draft of fluid on pump 189, inlet passage 193 enters cylinder 197 at such a point that piston 203 will, when accumulator cylinder 197 is charged with fluid, cover the entrance to passage 193 whereby no fluid will be admitted to pump 189 until further draft is made on the fluid stored in the accumulator. Pressure in chamber 200 is prevented from acting against the gears of pump 189 under these conditions by the one-way valve 199.

Movement of carrier 15 from pump 189 is controlled by a reverser valve 205, Figs. 4, 15, 16, 17, having a rotatable member 206 with cut away portions, as more particularly shown in Figs. 15 and 16, fitted in a suitable chamber 207. A port 208 leads from chamber 200 into chamber 207 and a port 209 leads from a point in chamber 207 adjacent to port 208 to a passage 210 communicating with the lower end of cylinder 187. Another port 211 leads from chamber 207 to a passage 212 leading to the upper end of cylinder 187. A port 213 leads from chamber 207 to reservoir 198 and constitutes an exhaust passage. When valve member 206 is in the position shown in Fig. 15, fluid will pass from pump 189 through port 208, chamber 207, port 209 and passage 210 into cylinder 187 below piston 188 thereby raising member 183, screw 179 and carrier 15. Fluid from the upper end of cylinder 187 will be forced through passage 212 and port 211 to chamber 207, Fig. 15, and pass to reservoir 198 through exhaust port 213. When member 206 is in the position shown in Fig. 16, fluid will pass from pump 189 through port 208, port 211, and passage 212 to cylinder 187 above piston 188, thus forcing member 183 downwardly and lowering screw 179 and carrier 15. Fluid from beneath piston 188 will be forced through passage 210 to port 209 through chamber 207 to exhaust port 213 and be returned to reservoir 198.

Carrier 15 may be clamped when in its lower position by bolts 214—214, Figs. 3, 5, and 17, axially slidable in the carrier 15 and vertically movable therewith, each comprising sections 215 and 216 axially opposed and threadedly engaging couplings 217—217. Bolt sections 215 and 216 have heads engaging T-slots 218 and 219 formed in the inner walls of frame 3 whereby when couplings 217 are turned the sides of frame 3 will be sprung together sufficiently to tightly clamp carrier 15 therebetween, the threads on section 216 being of the left-hand type. The couplings 217—217 are turned by fluid pressure by means of a cylinder 220, Fig. 5, having a piston 221 fixed on a rod 222 having rack teeth 223 and 224 formed at its ends and engaging gear teeth formed in couplings 217—217. Rod 222 is adjustable in length being formed in two sections 225 and 226 joined by a coupling 227 interposed between the sections. Admission of fluid to one end of cylinder 220 will accordingly move piston 221 and rod 222 in one direction and rotate couplings 217—217 to tighten bolts 214—214 while admission of fluid to the other end of cylinder 220 will cause piston 221 and rod 222 to move in the opposite direction and loosen bolts 214—214.

Fluid for clamping carrier 15 when in its lower position is supplied to cylinder 220 from the pump 189 which moves the carrier and is controlled on the same reverser valve 205 which controls carrier movement. With the valve 205 in the position shown in Fig. 16, that is to say, in the position which is effective to move the carrier downward, fluid then supplied under pressure to channel 211 moves a plunger 228, Fig. 17, against the pressure of a spring 229, thereby uncovering a port 230 which communicates with cylinder 220 through a passage 231 and a pipe 232, Fig. 5, slidable in a bore 233 which communicates with the right end of cylinder 220 through channel 234. With this adjustment of valve 205 piston 221 will be moved to the left and bolts 214—214 will be tightened. Under these conditions fluid in the left end of cylinder 220 will pass out through a channel 235 to a bore 236 and through a pipe 237 slidably fitted therein to a passage 238, Fig. 17, communicating with the port 209 of valve 205 and through chamber 207 and port 213 to reservoir 198.

Carrier 15 is also unclamped by the means of fluid from the pump 189 and controlled from the reverser valve 205. With valve 205 in the position shown in Fig. 15, fluid will pass from port 209 through passage 238, Fig. 17, pipe 237, Fig. 5, bore 236, and channel 235 to the left end of cylinder 220, thus moving piston 221 and rod 222 to the right and loosening bolts 214—214. Under these conditions fluid in the right end of cylinder 220 will pass out through the channel 234, bore 233, pipe 232, and port 230. At this time channel 211, Fig. 15, is in communication through the reverser valve 205 with exhaust port 213 whereby there will be substantially no pressure opposing spring 229. The plunger 228 will accordingly be forced down by spring 229 and communication will thereby be established between port 230 and a groove or channel 239, Fig. 17, formed in the side of plunger 228, whereby the fluid escapes into the upper end of a bore 240 in which plunger 228 moves and into reservoir 198 through a passage 241.

The purpose of plunger 228 is to insure that carrier 15 will not be clamped with frame 3 until it has reached its lowermost position. The spring 229 is of sufficient strength that it will not be overcome to admit clamping fluid through port 230 until the piston 188 and the carrier have reached the limit of downward travel.

The reverser valve 205 is operable manually from the front of the machine by means of a hand lever 242 fixed on a shaft 243 journaled in a portion of bed 1 and having a gear 244 fixed thereon in driving relation with a gear 245 fixed on a shaft 246 keyed in telescopic relation with a sleeve 247 adapted to permit sliding adjustment of frame 3 while maintaining the driving relation between shaft 246 and shaft 248. The sleeve 247 is fixed with a shaft 248 connected with valve member 206. Valve member 206 is never intended to remain in an intermediate position and to insure that it shall always take either the position shown in Fig. 15 or that shown in Fig. 16, a detent is provided consisting of a cam 249, Figs. 10 and 17, fixed on shaft 243 and a spring pressed plunger 250.

Reverser valve 205 may also be automatically shifted from table dogs such as 251 and 252, Fig. 1, as follows: A pair of vertically movable plungers 253 and 254, Figs. 1, 9, and 17, is provided at their lower ends with suitable rack teeth engaging opposite sides of a pinion 255 fixed on the shaft 243. By contact of suitable dogs either plunger may be moved to move valve 205 in the one or the other direction at any time during table movement. Ordinarily this is done somewhat before the limits of forward and reverser movement to unclamp and raise carrier 15 before reverse movement and to lower and clamp the carrier before forward movement.

This may be done by suitably locating dogs 251 and 252 with relation to dogs 132 and 133 whereby the plungers will be depressed in the proper sequence to bring about the above outlined results, or it may be done in other ways, for example, it is contemplated that dogs such as 256 and 257 might be utilized, dog 256 having cam surfaces 258 and 259 adapted to contact both plungers 134 and 253, plunger 253 preferably slightly in advance of plunger 134 whereby to reverse or stop table 2 promptly after raising of spindle carrier 15, and dog 257 having cam surfaces 260 and 261 adapted to contact respectively plungers 135 and 254, preferably plunger 254 slightly in advance of plunger 135 whereby to reverse or stop table 2 promptly after lowering of spindle carrier 15. Dogs 256 and 257 would cause spindle carrier 15 to be lowered and clamped during the time table 2 was moving to the left in Fig. 1 and unclamped and raised during the time table 2 was moving to the right, but it is contemplated that other dogs not shown could be provided for producing the opposite result, namely, lowering the spindle during progress of the table to the right, and raising it during movement of the table to the left.

By properly positioning dogs 251 and 252 and others, if necessary, of similar construction, not shown, the carrier may also be raised and lowered at intermediate points in the table movement for the cutter to pass over raised work portions for instance.

What is claimed is:

1. In a milling machine the combination of a stationary support, a horizontally reciprocable work table supported therefrom, a tool spindle rotatably supported from said stationary support, said spindle and table being relatively bodily vertically movable in directions respectively to increase and to decrease the spacing thereof, a power source, a power train for rotation of said spindle, a power train for said horizontal table movement, clamp means adjustable to a plurality of positions, one of which is adapted to clamp said spindle and table against said relative bodily movement, a power train operable from said source for either direction of said bodily vertical movement, means limiting said bodily vertical movement in one direction connectible for adjustment of said clamp means to said clamping position and means operable to prevent the connection of the last mentioned power train until said limiting means is in operation.

2. In a milling machine the combination of a stationary support, a horizontally reciprocable work table supported therefrom, a tool spindle rotatably supported from said stationary support, said spindle and table being relatively bodily movable in either direction of bodily movement, a power train for rotation of said tool spindle, a power train for said horizontal movement of said work table, clamp means adjustable to a plurality of positions, one of which is operable to fix said spindle and table against said vertical movement, means limiting said bodily vertical movement in one direction thereof, a power train for operation of said clamp means including a fluid pump and a fluid operable device, and control means for the last mentioned power train including shiftable valve means controlling delivery of fluid from said pump to said fluid operable device, and other valve means preventing said fluid delivery until said limiting means is operative.

3. In a milling machine the combination of a stationary support, a horizontal work table reciprocably supported from said stationary support, a spindle carrier slidably supported from said stationary support and vertically bodily adjustable, a horizontal tool spindle rotatably supported from said spindle carrier, a power train for rotation of said spindle, a power train for said horizontal movement of said work table, a power train for said vertical bodily carrier movement including a source of fluid supply, a motor operable therefrom and valve means controlling the operation thereof, automatic control means for the last mentioned power train and operable in accordance with said horizontal table movement to shift said valve means, clamp means adjustable to two positions, one of which is operable to fix said carrier against vertical movement, a power train for adjustment of said clamp means including a fluid operable device and a source of fluid pressure, and control means for the last mentioned power train including a valve means controlling delivery of fluid from said pressure source to said fluid operable device, and means controlling the operation of the last mentioned valve means in accordance with the operation of the first mentioned valve means.

4. In a milling machine, the combination of a base, a work table supported from said base for horizontal reciprocatory movement, a tool spindle rotatably supported from said base and axially transverse to the path of movement of said table, said spindle and table being relatively bodily vertically movable, a spindle train including a power source and a motion interrupting device, a table transmission including alternative feed rate and relative rapid traverse rate trains each driven from said power source, clamp means adjustable to a plurality of positions one of which is operative to prevent said relative bodily movement of said spindle and table, a power train driven from said power source and connectible for said bodily relative vertical movement of said spindle and table, and control means including means preventing adjustment of said clamp means into said one position thereof during said bodily relative movement of said spindle and table from said power train.

5. In a milling machine, the combination of a horizontally reciprocable work support, a tool spindle, transmission mechanism for alternatively moving said work support at relatively slow cutting rate or at relatively fast rate, transmission mechanism for relative vertical movement of said support and spindle to alternative cutting and non-cutting positions, clamp means operable to alternative positions respectively to restrain and to permit said relative movement, a power train for the operation of said clamp means, control means for each of said transmissions and operable in accordance with the movement of said support and at an intermediate point in the unidirectional movement thereof, and control means for said power train and operable to effect the position of said clamp means restraining said relative movement whenever said support and spindle are in said cutting position.

6. In a milling machine, the combination of a stationary support, a horizontally reciprocable work table supported therefrom, a tool spindle rotatably supported from said stationary support, said spindle and table being relatively bodily vertically movable in directions respectively to increase and decrease the spacing thereof, a power train for rotation of said spindle, a second power train for said table movement, a third power train for said relative vertical movement, a stop for limiting said relative vertical movement and adjustable for altering the limiting point thereof, control means for said third power train and operable to effect said relative movement in a direction against said stop, means limiting the pressure effective on said stop from said third power train, clamp means shiftable to a position effective to clamp said spindle and table against said relative movement, and a fourth power train connectible for shifting said clamp means to said position.

7. A milling machine as specified in claim 6 including means operative in accordance with the horizontal movement of the table for connecting the fourth power train.

8. A milling machine as specified in claim 6 including means operative in accordance with the horizontal movement of the table for connecting both the third and fourth power trains.

FRED A. PARSONS.

CERTIFICATE OF CORRECTION.

Patent No. 2,052,648.  September 1, 1936.

FRED A. PARSONS.

It is hereby certified that error appears in the printed specification of the above numbered patent requiring correction as follows: Page 6, first column, line 11, for the word "reverser" read reverse; and line 63, claim 1, after "direction" insert the comma and words , a power train; and that the said Letters Patent should be read with these corrections therein that the same may conform to the record of the case in the Patent Office.

Signed and sealed this 1st day of December, A. D. 1936.

Henry Van Arsdale
Acting Commissioner of Patents.

(Seal)